Sept. 27, 1966 E. G. DANNER 3,274,799
DRIVE-SHAFT ARRANGEMENT FOR A FLUID CIRCULATING DEVICE
Filed March 30, 1964
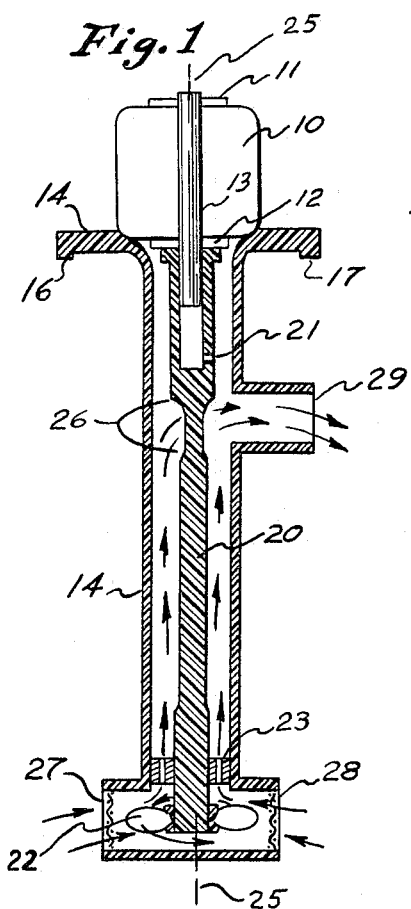
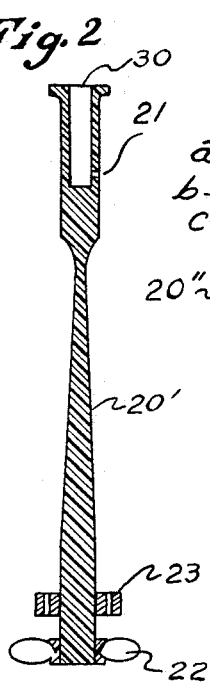
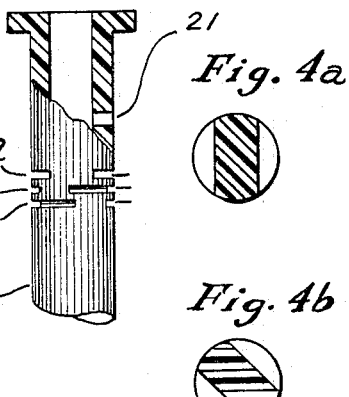
INVENTOR.
EUGENE G. DANNER
BY Kenneth E. Merkley
ATTORNEY

United States Patent Office 3,274,799
Patented Sept. 27, 1966

3,274,799
DRIVE-SHAFT ARRANGEMENT FOR A FLUID CIRCULATING DEVICE
Eugene G. Danner, 9122 71st Road, Forest Hills, N.Y.
Filed Mar. 30, 1964, Ser. No. 355,547
3 Claims. (Cl. 64—4)

The present invention relates to an improvement in a shaft or extension coupling employed as a drive-shaft for a low power motor or other driving device, used to transmit torque derived from such driving means to drive an impeller.

Keen commercial competition has developed in the manufacture and sale of accessory equipment for the maintenance and breeding of tropical fish. To meet competitive costs of various equipment such as water-pumps or circulators, water filters and water temperature maintaining devices, the use of low cost materials was introduced into the commercial market.

Up to the present time relatively high cost motors have been employed to drive the impeller or pumping mechanisms on water circulation or pumping devices used to circulate water in tanks supporting tropical aquatic life. These motors, which for the most part are mounted on or near a fish tank, substantially above the water level of the tank in which tropical fish and other aquatic life are maintained, generally include a relatively long drive shaft, such drive shaft being some eight to ten inches, for example. In fresh water a stainless or non-corrosive metal, with non-toxic producing effect on the live fish, was usually employed for the manufacture of such shafts, since a portion of the shaft comes in direct contact with the water in the fish tank. The cost of such metal is relatively high.

The water circulation device includes a submerged impeller, in a sub-housing, coupled to the lower end of the shaft. A casing is used to connect the upper housing and the sub-housing, serving to separate the live fish from the moving shaft and also as a conductor for water impelled up thru the casing and out of an outlet, for developing circulation of the water within the tank.

The shaft is normally passed through three bearings, two in the motor and one at the impeller end of the casing, a preferred construction of the water circulating device. A motor or driving device having a capacity of a normal output of from 1800 to 3000 revolutions per minute (r.p.m.) has been found to give adequate flow for producing the water circulation desired. With a shaft revolving at such speed great care must be taken to properly align the three bearings on a common axis. Also the shaft must be straight and aligned on the common axis otherwise wobble of the shaft and wear of the bearings and shaft would result.

If care were not taken with alignment and/or the shaft were not made true, the resulting wear often caused minute particles from the shaft and bearing to be introduced into the water in which the fish live. Such free particles caused some fish to become ill and die.

Also an out-of-line shaft, revolving at the speed of 1800 to 3000 r.p.m. reduces the life of the water pumping or circulating device and also causes excessive noise and water vibration, the later two having adverse effect on the fish living in the water.

With the introduction of salt-water aquatic life, the relatively long metal shafts on motors were replaced with a shorter metal stud, which does not extend into the water of the tank and a plastic shaft or coupling was used to couple the shaft stub of the motor with the submerged impeller. Manufacture of such plastic shafts was an expensive process because of the precision requirement involved to make the plastic shafts true. This had the effect of increasing the overall cost of some of the circulating devices, since alignment of the three bearings was still necessary even though the shaft coupling was of plastic material.

If the shaft were out-of-line excessive wear of both the shaft and the lower bearing resulted and minute plastic particles were introduced in the water of the tank. Such free plastic particles in the water also had adverse effects on the live fish. Further, the life of the pumping mechanism was greatly reduced, through the same effects developed by out-of-alignment of the metal shaft.

My invention provides an improvement in a plastic shaft or coupling, which avoids the necessity of precision alignment of the bearing near the impeller, with the axis of the bearings in the motor or driving device.

My unitary whip-absorbing plastic shaft avoids the necessity of providing an absolutely true shaft. The shaft may be molded, thereby avoiding the more costly manufacturing processes involved in making absolutely true, straight in-line plastic shafts.

My improved unitary whip-absorbing plastic shaft makes possible the manufacture of a water circulating device without precision alignment of the bearings in the preferred three-bearing type submersion water circulating unit. My invention also makes possible mass production of such unitary plastic shaft in a manner so as to reduce the cost of the individual shafts.

By reducing the unit cost of manufacture of such plastic shafts and avoiding precision manufacture of the shaft and unit housing, manufacture of a less expensive water circulating device is provided, with the reduced cost passed on to the consumer.

I have found that shaft whipping or wobble, developed in rotating an out-of-alignment plastic shaft may be absorbed in the body of the shaft itself, thereby producing substantially in-alignment action at the extremities of the plastic shaft even though alignment of the entire shaft be less than normally required and desired.

My preferred construction, as shown and described herein, includes the providing of an unitary plastic shaft, the body of which is almost totally rigid and the total of which is sufficiently strong for transmitting torque between the driving means and the fluid impeller, in which a small section has been reduced in diameter, or necked-down in diameter, at the upper end thereof, to such a degree so as to make the necked-down section sufficiently flexible so as to absorb whipping or wobble normally developed in out-of-alignment rotation, but sufficiently strong so as to transmit torque without fracture, breakage or separation. A plastic shaft of this construction may be mass produced, by molding, at substantially low cost per unit. The plastic employed may be any moldable plastic of the fibrous or non-fibrous type. I have used nylon in the manufacture of such shafts with great success.

By molding a multi-diameter unitary shaft, with a substantially defined necked-down section, a surface on the shoulder of such shaft is also provided for extracting or withdrawing the molded shaft from the mold, without the need of tapering the contour of the body of the rigid section of the shaft, by use of a "C" clamp type or other extraction tool.

In my accompanying drawings I show and describe two alternate constructions of unitary whip-absorbing plastic shafts. One form has a sharp taper on one side of the necked-down section and a gradual taper on the other side of the necked-down section, the gradual taper extending along the greater length of the shaft. A second alternate form is shown in which a series of closely spaced sections, of part of the material have been removed along individual diameters of the shaft, with each partial remaining section having an angular relationship to the adjacent section. These two alternate forms serve to provide the whip-absorbing action desired but the less sharply defined shoulders of these shafts do not accord as great a convenient means of easy extraction for the mold, as does the preferred construction.

Another advantage of the preferred type, necked-down shaft as well as the non-tapered shaft is that a sectional mold may be used in the production of such shafts so that various length shafts may be molded by adding or removing sections of the mold which are used to mold the substantially uniform section of the shafts.

Another advantage of my invention is that the whip-absorbing shafts are unitary in construction.

It is therefore a object of the present invention to provide a plastic one-piece whip-absorbing shaft for transmitting torque from a driving means to a remote impeller.

Another object is to provide a whip-absorbing drive shaft of unitary construction which is inexpensive to produce.

Another object is to provide a multi-diameter plastic drive shaft which is substantially rigid along the major part of its length but reduced in diameter in a minor section of its length so as to be sufficiently flexible to absorb whip or wobble without fracturing or separating while still transmitting torque to a remote impeller.

Other objects will become apparent from reading the following description in conjunction with the drawings in which:

FIG. 1 diagrammatically illustrates a whip-absorbing unitary shaft of preferred construction, coupled to the drive stud of a motor with the motor mounted on the upper plastic housing of a circulating device with the shaft inserted in the housing or casing, coupled to an encased, submerged impeller;

FIG. 2 diagrammatically illustrates a whip-absorbing unitary shaft of taper construction;

FIG. 3 diagrammatically illustrates a whip-absorbing unitary shaft with closely spaced sections removed from the shaft and FIG. 4, including FIG. 4a, 4b and 4c illustrative cross sections of the removed parts of the unitary whip-absorbing shaft.

Referring to FIG. 1 a motor 10 is represented with bearings 11 and 12 and drive shaft 13 mounted on a housing 14. The housing 14 is constructed so as to be mountable on the top or upper part of the frame a fish tank, for example, with lips 16 and 17 anchoring the housing from the exterior of the frame of the tank across a corner of the tank.

The shaft 13 terminates on its lower end by a stud extending from the interior of the motor 10. The internal components of the motor and the electrical connections are not illustrated. The whip-absorbing unitary plastic shaft 20 is friction held onto the shaft 13 with a vent 21 molded into the shaft to provide a pressure leakage vent so as to avoid breakage through pressure formed when the plastic shaft is forced onto the shaft 13 because of the tight fit.

The housing 14 includes a hollow tube or casing terminating in a sub-housing with two screened inputs and a cavity in which the impeller 22 is suspended. The impeller is mounted on the shaft 20 which extends beyond a perforated bearing 23, into the cavity of the sub-housing.

The broken line 25 represents a true axis of bearings 11 and 12 while the entire lower construction is drawn somewhat exaggerated so that the center of bearing 23 is out-of-line with the axis, being offset for purposes of illustration.

The necked-down section 26 of shaft 14 is of sufficient flexibility so as to absorb whip that develops during rotation of the shaft due to the out-of-line condition.

When operating, the motor, through the shafts 13 and 20, rotates the impeller 22 to suck in water through the screened intakes or inputs 27 and 28. The water is forced through the perforated bearing 23 and up the hollow housing or casing to the spout or outlet 29. Thus circulation of the water in the tank is generated.

The construction of the housing is such as to reduce vibration of the hollow section to an absolute minimum. Absence of vibration in the housing is preferred so as to provide gentle circulation of the water in the tank and avoid vibrating the body of water.

As illustrated, rotation of the shaft 20 would ordinarily produce whipping of the shaft and/or a circular or wobbling motion at the impeller end of the shaft.

By employing my improved whipping-absorbing plastic shaft the whipping action is absorbed in the section 26 and the impeller end of the shaft rides, wobble free while in an off-center or out-of-alignment condition.

FIG. 2 illustrates the tapered form of whip-absorbing necked-down shaft 20: an alternate construction.

It should be noted that the shafts are cylindrical in construction although my preferred form could be other than cylindrical along its length with the necked-down section being cylindrical, for even absorption of whip or wobble.

The taped construction of my whip-absorbing shaft in FIG. 2 also includes the perforated bearing 23 and the impeller 22 and a vent 21 at the base of the collar 30.

These shafts would be substantially interchangeable so long as the plastic collar section (30 in FIG. 2) would fit onto the shaft 13 (in FIG. 1) and the plastic shafts were of the same length.

Obviously, if the stud of shaft 13 were hollow, the collar section 30, and associated vent 21 may be eliminated and the diameter of the upper part of the shaft 20 may be made sufficiently small so as to be inserted or mated into the hollow of the shaft 13.

FIG. 3 illustrates another alternate construction of my whip-absorbing shaft 20 in which closely spaced sections (three shown) have been removed with each removed section offset from the adjacent section while FIGS. 4a, 4b and 4c are cross section views of the respective areas on the shaft so having a portion thereof removed. The slightly shaded areas of the respective figures show the remaining material on the unitary shaft.

Thus I have illustrated the preferred construction and two alternate constructions of my whip-absorbing unitary plastic shaft.

Referring again to FIG. 1, it will be noticed that the shoulder of the upper part of the necked-down section 26 provides a convenient area where an extracting tool may be used to withdraw the remainder of the body of the shaft from a mold, while the lower shoulder may be used to extract the shaft 20 from the stud of shaft 13 by a similar clamp or extracting tool.

The plastic from which my whip-absorbing unitary shafts may be made are any of the substantially rigid type, moldable plastics. I have found that nylon and reenforced epoxic fiberglass work very well and provide the desired whip-absorbing action. Other plastics may be used, other than those mentioned above, as will be familiar to those skilled in the art.

Although the preferred construction and alternate constructions of my whip-absorbing unitary plastic shaft have been illustrated and described, other forms of construction may be made as will be familiar to those skilled in the art, without departing from the invention as defined in the appended claims.

I claim:

1. A fluid circulating device including; a tubular housing; a motor having a drive shaft mounted in one end of said housing;

bearing means secured adjacent the other end of said housing;

the axis of said drive shaft and bearing means subject to misalignment, a substantially rigid shaft rotatably supported near one end by said bearing means and non-rotatably connected at the other end with said drive shaft, said shaft having a portion of reduced dimension for forming a flexible section, the breadth of said section substantially equal to the diameter of said shaft, and the thickness of said section substantially less than said breadth.

2. A fluid circulating device as in claim 1 and in which said tubular housing includes outlet means positioned between said one end and said other end, and said tubular housing extends beyond said bearing means at said other end and includes a sub-housing including a cavity and an inlet and an outlet, and said shaft extends into said cavity for receiving an impeller, and impeller means coupled to that part of said shaft which extends into said cavity.

3. A fluid circulating device, as in claim 1, and in which said tubular housing includes outlet means positioned between said one end and said other end, and said tubular housing extends beyond said bearing means at said other end, and includes a sub-housing including a cavity and an inlet and an outlet, said bearing means including at least a perforation for defining said outlet of said sub-housing, said shaft extending into said cavity for receiving an impeller, and impeller means coupled to said shaft in said cavity for drawing fluid through said inlet and forcing said fluid through said outlet of said sub-housing and out of said outlet means of said tubular housing.

References Cited by the Examiner
UNITED STATES PATENTS

| | | | |
|---|---|---|---|
| 1,490,219 | 4/1924 | Labberton et al. | 64—1 |
| 1,612,321 | 12/1926 | Soderberg | 64—1 |
| 1,653,899 | 12/1927 | Goff | 64—15 |
| 1,913,886 | 6/1933 | Kennedy | 64—1 |
| 2,067,287 | 1/1937 | Pearce | 64—1 |
| 2,284,428 | 5/1942 | Inderband | 64—15 |
| 2,776,556 | 1/1957 | Gustafson et al. | 64—27 |
| 2,851,892 | 9/1958 | Parkinson et al. | 64—1 |
| 2,857,749 | 10/1958 | Fabbri et al. | 64—11 |
| 2,868,132 | 1/1959 | Rittershofer | 103—89 |

FRED C. MATTERN, JR., *Primary Examiner.*

H. C. COE, *Assistant Examiner.*